United States Patent [19]

Lemanski

[11] 3,918,332

[45] Nov. 11, 1975

[54] SELECTIVELY WEDGE CLAMPING TOOL HOLDER

[76] Inventor: Savarian F. Lemanski, 109 Taylor Ave., Detroit, Mich. 48202

[22] Filed: June 10, 1974

[21] Appl. No.: 478,004

[52] U.S. Cl. .............................................. 82/36 R
[51] Int. Cl.² ......................................... B23B 29/00
[58] Field of Search ....................... 82/36, 36 A, 37

[56] References Cited
UNITED STATES PATENTS

| | | | |
|---|---|---|---|
| 1,677,143 | 7/1928 | Lange et al. ............................. | 82/36 |
| 2,571,530 | 10/1951 | Brekke .................................... | 82/36 |
| 3,260,141 | 7/1966 | Jeanneret ................................ | 82/36 |
| 3,466,955 | 9/1969 | Stier ....................................... | 82/36 |
| 3,498,164 | 3/1970 | Miko et al. ............................. | 82/37 |
| 3,813,971 | 6/1974 | Lemanski ............................... | 82/36 |

FOREIGN PATENTS OR APPLICATIONS 330,218   5/1958   Switzerland ............................ 82/36

*Primary Examiner*—Harrison L. Hinson
*Attorney, Agent, or Firm*—Whittemore, Hulbert & Belknap

[57] ABSTRACT

The holder comprises a massive metal block-like base adapted to be engaged releasably on the conventional mounting post or similar tool holder support of a lathe or other type machine tool. Intermediate top and bottom portions thereof the base is provided with a relatively large horizontal and transversely elongated cavity opening to the front thereof, which cavity is of square sectional outline in a front-to-rear plane. This cavity in turn opens through a further horizontal square-sectioned aperture paralleling said plane, said aperture passing through the rear of the holder base and forwardly intersecting the said transverse cavity. In one of a number of optional uses of the basic tool holder a relatively massive steel mounting block for a boring bar, lathe-type or other related machine tool cutter is releasably receivable in the front-to-rear extending aperture; and one or more other cutting tool mounts may be assembled in the forward cavity in side-to-side relation to such tool mounting block, these supplementary mounts also being block-like in nature and releasably clamping cutters to extend forwardly of the otherwise open mouth of said cavity of the holder. As an alternative, tool mounts of this sort may be removed from the holder and replaced forwardly of the transverse cavity of the base by a further relatively massive mounting block for one or more cutters, typically of the carbide-tip insert type. This second optional block has an integral tonque of substantial size which extends rearwardly into the cavity of the holder base, thus affording a part at which said replacement block, like the other type holders mentioned above, may be accurately registered on and then rigidly clamped to the base by locator pin and wedge rod means operated from above. Said optional block may be reversed 180° in a vertical plane paralleling the front of the mounting base block, thus to selectively present as many as two or more such cutters to project laterally from a side of the last-named block. In all of these arrangements the tool mounts are properly located relative to the block by locating pins yieldably sustained vertically in one pin position by spring biased ball and groove detent means, said pins being bodily removable from the basic holder structure when not in use to release the tool mount, as for storage; and as thus located the mounts are rigidly clamped in place by a vertically elongated wedge rod. This rod, upon rotation on its upright axis, engages an integral cam-shaped wedge formation thereon with a vertical side surface of the tool mount, thus to clamp the latter rigidly in place upon the body or base of the holder.

26 Claims, 10 Drawing Figures

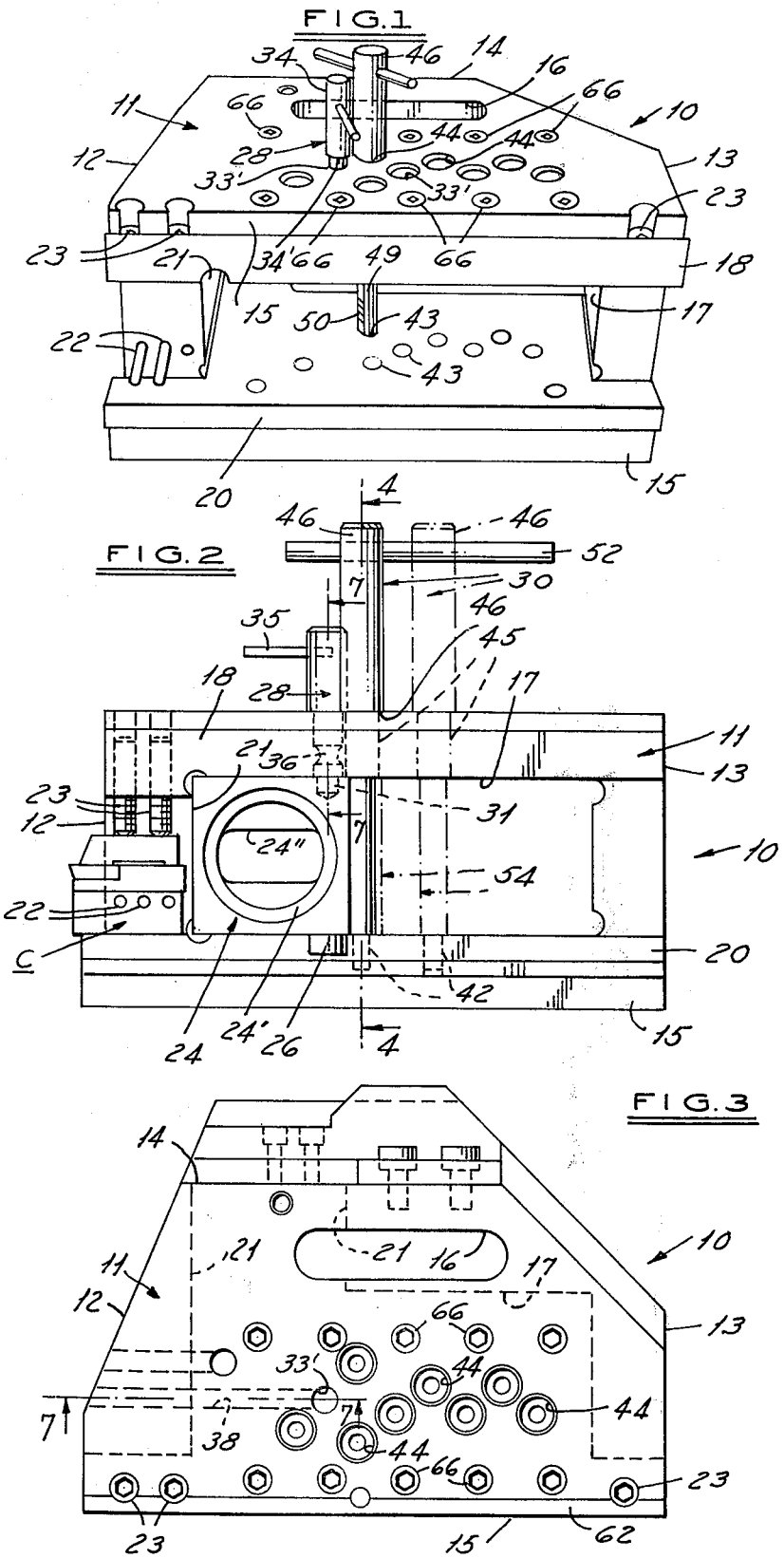

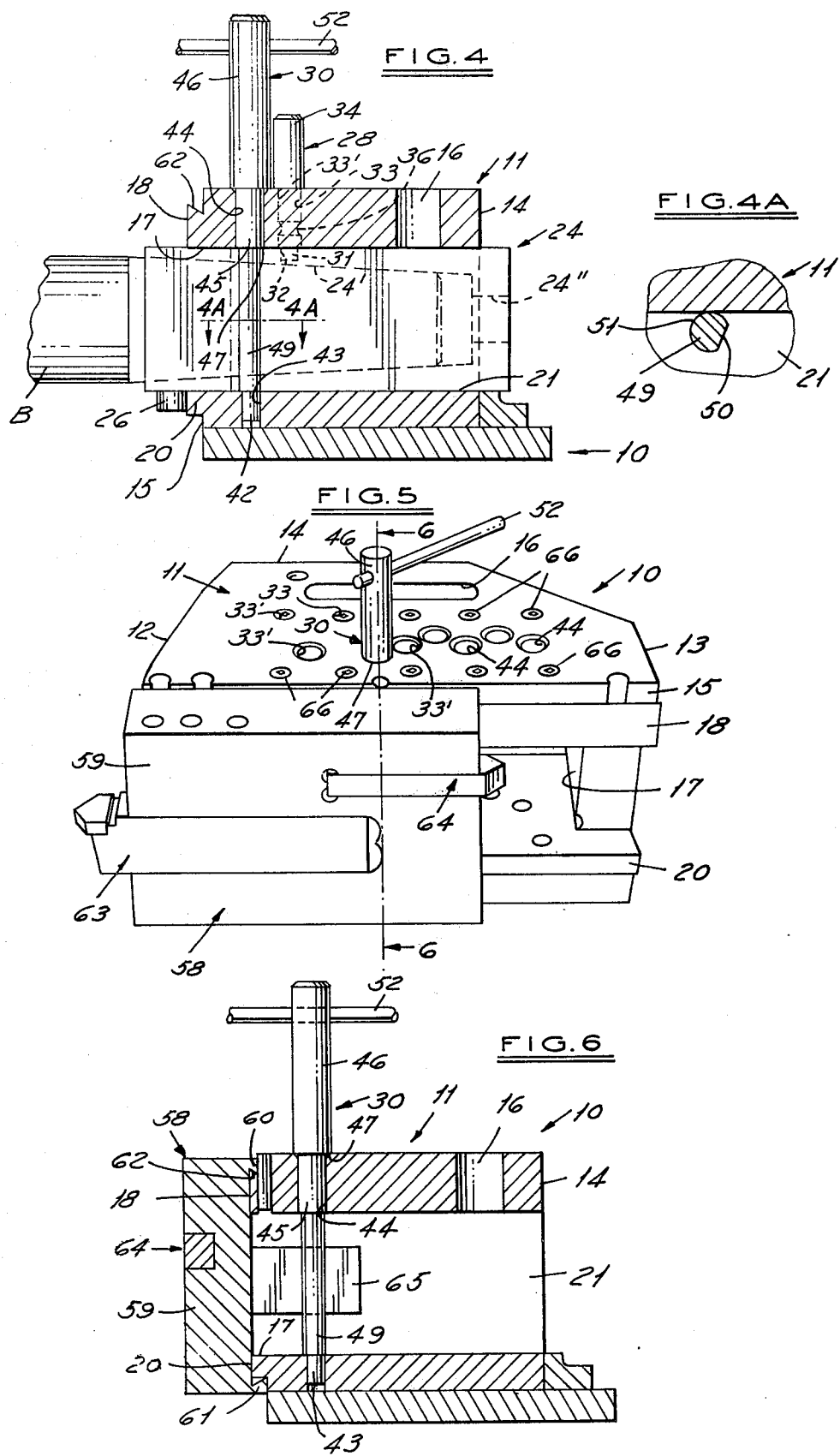

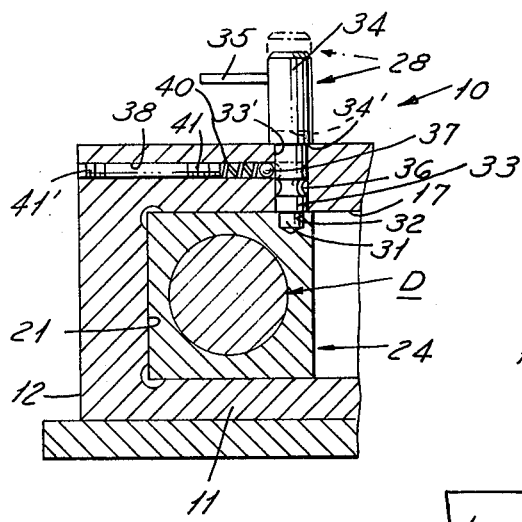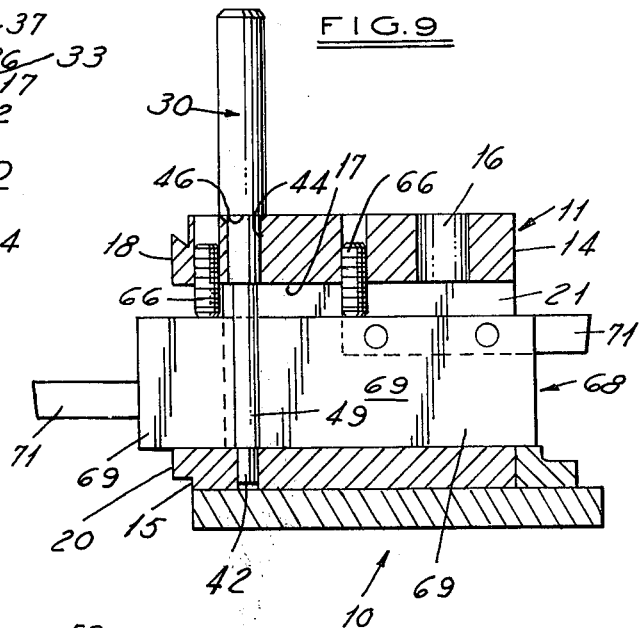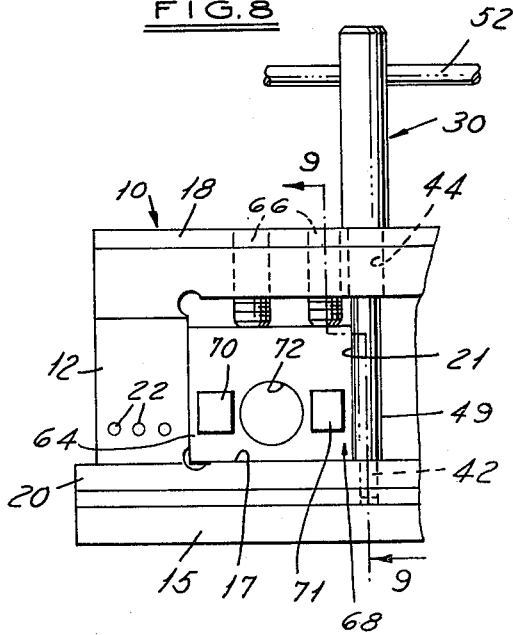

SELECTIVELY WEDGE CLAMPING TOOL HOLDER

CROSS-REFERENCE TO RELATED APPLICATION

My co-pending application, Ser. No. 258,097, filed May 30, 1972 and titled "Quick Change Tool Holder", shows and describes a machine tool adjunct comparable in its versatility in use to the wedge clamping tool holder of the present application, with the observation that the latter is somewhat less complex in its structure than that of said earlier application.

BACKGROUND OF THE INVENTION

1. Field of the Invention

The present improvement finds application in the same general field as that of its above-entitled precedent application, that is, in practically all known types of mechanical workpiece cutting or material removing operations in which the workpiece is presented rotatively or fixedly in a moving relationship to a tool or tools fast on the holder, including conventional machining operations in which the tool is moved across a surface of a fixed workpiece, or vice versa.

2. Description of the Prior Art

Of the patents of which I am aware, the patent to Newton, U.S. Pat. No. 1,951,488 of Mar. 20, 1934, employs wedge rod and ball detent type elements only very generally similar to the components mentioned in the last two sentences of the Abstract, but for actions quite different from those performed in the present holder improvement.

SUMMARY OF THE INVENTION

The improved wedge-clamping tool holder enables multiple cutters to be variously and optionally mounted in various positional relationships, including reversals of dual ended cutters, then accurately located unfailingly in the desired position relationship. Once thus positioned the individual holder unit is locked strongly to the massive body or base of the holder, enabling cutting tool or tools to be brought into play in any desired relation to the workpiece in a minimum time and with minimum effort.

BRIEF DESCRIPTION OF THE DRAWINGS

FIG. 1 is a top and front perspective view of the tool holder of the invention as stripped of tool mounts, indicating typical placements of a frictional clamping wedge rod and a locating pin in upwardly opening bores in the body or base block of the holder;

FIG. 2 is a front elevational view showing the optional mounting of a conventional boring bar mount in the vertically intermediate forward cavity and front-to-rear through-aperture of the holder body, said mount being located and clamped to the body by the locating pin and wedge rod provisions above referred to, the view also indicating in dot-dash line an optional locating and clamping of another size and type of cutter mounting units in a side-by-side relation to the boring bar holder;

FIG. 3 is a top plan view of the basic holder, being like FIG. 1 devoid of individual holders and cutters;

FIG. 4 is a view in vertical section on line 4—4 of FIG. 2, showing structural features of a rotatably mounted frictional wedge rod unit of the invention as applied to the base of the holder;

FIG. 4A is a fragmentary view in horizontal section on line 4A—4A of FIG. 4;

FIG. 5 is a front perspective view showing the mounting body of the holder as optionally equipped with a dual-end cutter mounting block clamped across its front face, which block is 180° positionable in a vertical plane to present different lathe-type cutters for operation;

FIG. 6 is a view in vertical cross-section along line 6-6 of FIG. 5, illustrating dovetail or undercut tongue and groove type means by which the block of FIG. 5 may be reversably positioned, located and wedge-clamped to the holder;

FIG. 7 is a vertical section on line 7—7 of FIG. 2, showing structural features of the vertically shiftable, ball-detent type locator pin means of the improvement;

FIG. 8 is a front elevation depicting a further optional double-tool mounting block of reduced height as mounted to the basic holder body in a manner somewhat similar to the boring bar mount; and FIG. 9 is a view in vertical section on line 9—9 of FIG. 8.

DESCRIPTION OF A PREFERRED EMBODIMENT

The improved selectively wedge clamping tool holder of the invention, as generally designated by the reference numeral 10, comprises a relatively massive steel mounting base or block 11 which is (per FIG. 3) of a laterally truncated triangular nature in plan, in reference to upright side surfaces 12, 13 and a rear surface 14 thereof. Block 11 carries an elongated oblong hole 16 extending vertically therethrough adjacent its rear, which hole conventionally telescopes over a standard tool holder part (not shown) of a machine tool in adjustably mounting the holder 10 to such tool.

The front surface 15 of body 11 is machined to substantial rearward depth to provide a sidewise-elongated oblong cavity 17; this is of square cross-section, per FIG. 4, in a vertical plane at 90° to the lateral, side-by-side dimension of the cavity 17. The cavity opens forwardly of the front of the block 11 and is faced horizontally along its top by a well-machined vertical plate surface 18. This surface extends uninterruptedly across the full horizontal dimension of said block, being formed at and along its top to provide a dovetail-undercut groove for a purpose to be later described. In vertically spaced downward relation to its upper surface 18, and beneath the cavity 17, block 11 is provided with a second well-machined vertical forward surface 20; this surface is also substantially co-extensive in horizontal length with said block, and is in vertical register with surface 18.

Further, the holder base 11 is formed at its rear to provide a tool mount-receiving aperture 21 of square cross-section for a purpose later described. This aperture is located at one end of the horizontally extending holder cavity 17 (left end as viewed in FIGS. 1 and 2), is of the same cross-sectional dimensions as said cavity, and extends rear-to-frontwise from holder surface, forwardly intersecting and opening to and flush with the cavity 17 adjacent its top and bottom.

As a desirable option, end portions of the front surface 15 of block 11 at either side of cavity 17 may receive between the upper and lower surface portions 18 and 20 a carbide tip type cutter sub-assembly, generally designated by the reference character C. This sub-assembly, which is, per se, of a conventional nature and constitutes no part of the invention save in the manner it is mounted to holder 10, comprises a cutter mounting bottom block that is end-notched to receive a triangular carbide insert, a chip breaker and a clamp plate. As thus conventionally arranged, the sub-assembly C may be removably registered onto a pair of small cylindrical pins 22 which take removably into correspondingly spaced and sectioned recesses in the rear of the mounting block of said sub-assembly C.

Said pins are forwardly withdrawn from the front of block 11 when use of the sub-assembly is not in order, especially when the main holder mount 10 is to support a forwardly-hung tool mounting block of the nature shown in FIGS. 5 and 6. As thus registered on pins 22, cutter sub-assembly C is conventionally clamped in place from above, as by one or more Allen-type locking set screws 23 threaded from above into the top surface of the body block 11.

FIG. 2 shows said block as being removably equipped with a taper drill holder block 24 of square cross-section in but a trifle smaller dimensioning than body aperture 21, and a front-to-rear length as slidably received in the body hole or aperture 21, sufficient to substantially over-extend the main holder surface 15 forwardly, as well as to project behind the rear surface 14.

Taper drill holder 24 is conventionally provided with tapered recess 24' to frictionally hold the bar, designated D, said recess also conventionally having a horizontally elongated rear tang and drift-receiving opening 24'. In order to properly locate block 24 initially in rough relation to holder body 11, it is provided with a machined stop 26 adjacent its forward end, which stop is intended to engage rearwardly against the lower machined forward surface portion 20 of body 11. Holder 24 may be oriented as appears in FIG. 7, or shifted 90° to lie on a side thereof.

In common with other optional tool holders contemplated by the invention, some of which are hereinafter referred to, the holder block 24 is further registered more accurately in the block 11 by a vertically shiftable and removable locating pin, generally designated 28, and is then clamped in place by a rotative vertical removable wedging rod 30. Said locating and clamping units 28 and 30 are of primary importance in the invention.

Thus, as best shown in FIG. 7, a locating pin 28 (of which a desired number may be furnished for optional uses of the holder 10) comprises a cylindrical bottom end 31, which when the pin is fully down is removably received and bottoms in a locating recess 32 drilled in the top of the holder block 24, a somewhat larger diameter intermediate cylindrical guide portion 33, and a substantially larger diameter top portion 34, whose lower shoulder 34' engages on the top surface of the holder body in the down-most position of locator pin 28. Portion 34 carries a capstan-type radial operating hand piece 35. The intermediate locating pin portion 33 is formed with a detent or retainer groove 36 about its perimeter; and when pin 28 is fully inserted downwardly in said recess, the surface of pin portion 33 just above groove 36 is laterally engaged, as shown best in FIG. 7, by a detent ball 37. Said ball is disposed in a laterally drilled horizontal bore 38 in holder body 11 and is urged in the pin-engaging position by a coil spring 40. The ball is kept from movement out of bore 39 by a small annular inner lip of the latter, and a plug 41 threaded in the bore 39 is rearwardly abutted by said spring. However, when pin 28 is elevated sufficiently to remove its reduced diameter lower end 31 from the locating recess 32, thereby freeing it from exerting lateral restraint on the holding block 24 (or other tool holder), the detent ball 37 snaps into the retainer groove 36 and sustains locator pin 28 in its somewhat elevated, inoperative position. If desired, said locator pin may be fully removed from the block 11 by a still further upward lift thereon, clearing its portion 33 from a guide bore 33' in body 11. A second outer plug 41' threaded in horizontal bore 38 prevents fouling of the latter by foreign matter.

As depicted best in FIGS. 1, 2, 4 and 4A, the wedge rod 30 of the equipment 10 is formed, like locating pin 28, to provide a bottom cylindrical pilot portion 42 of reduced diameter, which, when the rod is operatively applied through base 11 from above, fits downwardly into a hole 43 drilled in the bottom surface of the holder's cavity 17. In thus applying wedge 30, the latter is fully inserted downwardly in a bore 44 in the upper part of the base or body, this bore being in vertical alignment with the hole 43 but of substantially greater diameter. Bore 44 slidably and rotatively receives cylindrical guiding portion 45 of the wedge rod 30, which portion is concentric with and spaced substantially above the rod's bottom pilot portion 42; and an upper greatest diameter cylindrical portion 46 of said rod affords a shoulder 47 which rests atop the upper body block surface when the rod 30 is fully inserted downwardly in the latter's bore 44, the rod's lower end 42 being then rotatable in a cavity pilot hole 43.

An integral eccentric wedge or cam surface portion 49 is formed in the axial portion of rod 30 between its concentric guiding and piloting portions 45, 42, respectively, as by grinding the rod in this zone to provide a flat 50 on one side which merges with one circumferential end of an eccentric wedging portion 51 of increasing diameter about the remainder of the periphery of portion 49 back to the flat 50. The location of the wedging surface portion 51 is such that when rod 30 is fully inserted downwardly into the guide bore and pilot hole of block 11, its flat 50 may just clear an adjacent side surface of a tool holder, such as the holding block 24, yet upon rotation of the rod a few degrees the eccentric wedging surface 51 will frictionally engage laterally against said tool holder unit and wedge the same, as previously registered accurately in base or body 11 by locating pin 28, in a very tightly clamped relation to holder 10. Yet the unit is readily freed from this lock-up by a slight reverse rotation of rod 30. For its rotative manipulation, the upper portion 46 of the rod is provided with a through bore which receives an operating capstan arm 52. Like the locating pin 28, a sufficient quantity of rods 30 will be furnished for use in instances in which plural tool units are to be simultaneously mounted on holder 10; and the latter will of course be drilled at plural openings or bores to receive locator pins and wedge rods for the purpose, as appears in FIGS. 1 and 3.

FIG. 2 illustrates in dot-dash line a contemplated extension of the use of holder body cavity 17 in mounting one or more generally similar auxiliary tool holder units in a side-by-side relation to a holder unit such as the holding block 24, or a related front-to-rear oriented unit like the one shown in FIG. 8.

These typical units, as generally designated 54, may comprise a rectangularly dimensioned block-like body member 55 of, say ½ inch to 2 inches width, a height a bit less than that of the cavity 17 in which it is inserted, and a front-to-rear proportioning such that it projects somewhat forwardly of the mouth of the cavity when fully bottomed rearwardly in the latter. The upper surface of body member 55 may be provided with a piloting recess to accommodate a locator pin 28; and the cavity 17 and upper part of the mount's base 11 are of course drilled as described above to receive the requisite wedge clamp rods 30 and locator pins. Body member 55 is suitably bored to receive one or more cutters as, for example, a twist drill, a reamer, or the like.

Pursuant to the invention, holders such as boring bar holder block 24 and the supplementary holder blocks are square or rectangular in cross section presenting side surfaces at which they may be engaged with one another in succession and common parallel upright dimensions receivable in the correspondingly dimensioned cavity 17. Thus proportioned the holders may be disposed in said cavity in optional orientations in reference to the vertical, depending on the cutter mounted thereby.

FIGS. 5 and 6 show the holder body 11 as supporting another type of tool holder, generally designated 58, in the form of a relatively massive and elongated block part 59 of transversely elongated rectangular or oblong cross section, which is used when cavity 17 is otherwise unoccupied. This block is suspended by either one or the other of a pair of acutely angularly undercut or dovetail-type rear lips 60, 60' thereon, which engage selectively from above and mate with a previously referred to, similarly undercut supporting lip 62 formed above and across the horizontal length of the upper facing portion 18 of block 11.

As suggested in my copending application identified above, it is desirable to restrain the suspended tool holder block 59 against movement paralleling its suspension lips 60, 60'. To this end the upper portion of main block 11 and the facing upper portion of the block 59 are provided with registering semi-cylindrical recesses; these matingly receive opposite sides of a cylindrical upright registering and interlocking pin 61, thus to prevent horizontal shift of the holder block 59.

Block part 59 adjustably receives a pair of cutters 63 and 64, which project from opposite ends of said part; and it is apparent that upon being disengaged from the supporting block lip 62 the tool holder 58 may be rotated 180° in a vertical plane and re-engaged at its other undercut lip 60 or 60' with the support lip 62, so as to optionally present either cutter 63 or 64 for a machining operation, as projecting from a side of main block body 11. As thus selectively positioned, the holder 58 may be registered in place by a locator pin 28 inserted downwardly from the top and rigidly clamped in place by a wedging rod 30, in the same fashion as another tool holder such as the above-described boring bar mount. The difference is that the locating and clamping actions are exerted on an integral rearwardly projecting tail piece 65 of the block part 59 of holder 58, as appears in FIG. 6. The cutters 63, 64 are removably held in place on block 59 by set screws applied thereto through the top thereof (FIG. 5).

Other than the main block openings 33' and 44 receiving the locating pin 28 and wedge rod 30, which are, as indicated above, multiplied an appropriate number of times for locating and clamping the various sorts of tool holder, the upper surface of block 11 may also be drilled and tapped to receive two rows of conventional Allen-type socket set screws 66. These rows parallel and overlie the cavity 17; and screws 66 are manually adjustable in any number desired to extend well downwardly into said cavity, thus to directly engage and clamp other types of tool parts of diminished height.

FIGS. 8 and 9 of the drawings show an optional alternative type of tool holder unit, generally designated by the reference numeral 68. This typically comprises a body block structure 69 in which different types of cutter, such as are shown at 70 and 71, the block 69 being releasably clamped, as by Allen socket set screws 66, 66 applied as described just above, to project from opposite ends of holder structure 69. This type of unit is, as mentioned, of less height than the taper drill holder 24, for example, so that it is clamped in place soley by a desired selection and manipulation of the set screws 66. A quick and easy 180° reversal of the position of holder unit 68 on base 11 then brings either tool 70 or 71, or a substitute therefore, into play.

Another tool (not shown) may be mounted in a front-to-rear bore 72 of block 69; and in each case the tool is releasably clamped in said block by socket screws taking into the block from a side thereof.

As appears from the above, in presenting a transverse tool holder cavity and front-to-rear aperture which are of rectangular (preferably square) cross section in intersecting vertical planes, and preferably proportioned vertically to receive with slight clearance various types of block-like tool holder, whose proportioning as to dimension is but a trifle less than that of the cavity and aperture, the invention enables a large variety of such tool holder blocks to be mounted to the basic holder block structure, using securing means of either a wedging or clamping set-screw type. Moreover, particularly as appears in FIGS. 5, 8 and 9, the tool holder block may receive plural tools at either one or both ends thereof, thereby affording a tool mount of great versatility, yet ease of manipulation in use.

What is claimed is:

1. A tool holder optionally employed to removably mount plural types of machine tool members, said holder comprising a relatively massive base, said holder base being provided with aligned parallel portions spaced substantially from one another and defining therebetween a cavity opening through a side of said base and proportioned to receive at least one of said machine tool members, at least one locator pin mounted and guided by said holder base in aligned bores in said respective portions thereof, said pin being adapted to project into said cavity into releasable locating engagement with a tool member so received in said cavity, and a wedging clamp rod also mounted and guided by said base in a further pair of aligned bores of said base portions to project into said cavity adjacent a tool member, said rod being provided with a wedging portion frictionally engageable with said tool member in clamping the latter to said base.

2. A tool holder optionally employed to removably mount plural types of machine tool members each characterized by a sub-assembly of at least one cutter and a mount removably receiving the same, said holder comprising a relatively massive base having means to releasably mount the same on a machine tool for machining engagement with workpieces, said holder being provided with aligned parallel portions spaced substantially from one another and defining therebetween a cavity opening through a forward side of said base and proportioned to receive at least one of said machine tool members, at least one locator pin slidably mounted and guided by said holder base in aligned bores in said respective portions thereof, said pin being adapted to project from above into said cavity into releasable locating engagement with a cutter mount of a tool member sub-assembly so received in said cavity, and a wedging clamp rod also mounted by said base in a further pair of aligned bores of said base portions to project from above into said cavity adjacent and to one side of a tool member mount, said rod being rotatable about its upright axis in said base and being provided with a wedging portion frictionally engageable with a side of said tool member mount in clamping the latter to said base.

3. The tool holder of claim 1, in which said cavity is proportioned in a rectangular cross-sectional outline to receive a similarly sectioned tool member.

4. A tool holder optionally employed to removably mount plural types of machine tool members each characterized by a sub-assembly of at least one cutter and a mount removably receiving the same, said holder comprising a relatively massive base having means to releasably mount the same on a machine tool for machining engagement with workpieces, said holder being provided with a cavity opening through a forward side thereof and proportioned to receive at least one of said machine tool members, at least one locator pin slidably mounted by said holder base to project from above into said cavity into releasable locating engagement with a cutter mount of a tool member sub-assembly so received in said cavity, and a wedging clamp rod also mounted by said base to project from above into said cavity adjacent and to one side of a tool member mount, said rod being rotatable about its upright axis in said base and being provided with a wedging portion frictionally engageable with a side of said tool member mount in clamping the latter to said base, said base being provided with an aperture therethrough which opens to said base cavity from the rear side of the base and at 90° to the cavity, said cavity and aperture being similarly proportioned in a rectangular cross-sectional outline to receive a tool member.

5. The tool holder of claim 3, in which the cross-sectional proportioning and outlining of the base cavity is substantially the same as that of the tool member.

6. The tool holder of claim 4, in which the cross-sectional proportioning and outlining of the base cavity and aperture are substantially the same as that of the tool member.

7. The tool holder of claim 4, in which the cutter mount of said tool member sub-assembly has a hole at the top thereof in which the lower end of a locator pin is removably received in accurately registering the sub-assembly in said cavity of the base, said wedging clamp rod having rotatable frictional wedging engagement with a side of the cutter mount in releasably clamping said sub-assembly to said base.

8. The tool holder of claim 6, in which the cutter mount of said tool member sub-assembly has a hole at the top thereof in which the lower end of a locator pin is removably received in accurately registering the sub-assembly in said cavity of the base, said wedging clamp rod having rotatable frictional wedging engagement with a side of the cutter mount in releasably clamping said sub-assembly to said base.

9. A tool holder optionally employed to removably mount plural types of machine tool members each characterized by a sub-assembly of at least one cutter and a mount removably receiving the same, said holder comprising a relatively massive base having means to releasably mount the same on a machine tool for machining engagement with workpieces, said holder being provided with a cavity opening through a forward side thereof and proportioned to receive at least one of said machine tool members, at least one locator pin slidably mounted by said holder base to project from above into said cavity into releasable locating engagement with a cutter mount of a tool member sub-assembly so received in said cavity, and a wedging clamp rod also mounted by said base to project from above into said cavity adjacent and to one side of a tool member mount, said rod being rotatable about its upright axis in said base and being provided with a wedging portion frictionally engageable with a side of said tool member mount in clamping the latter to said base, said locator pin being vertically sustained in an elevated position out of engagement with the sub-assembly cutter mount by ball detent means acting at a side of said pin.

10. The tool holder of claim 4, in which said locator pin is vertically sustained in an elevated position out of engagement with the sub-assembly cutter mount by ball detent means acting at a side of said pin.

11. The tool holder of claim 8, in which said locator pin is vertically sustained in an elevated position out of engagement with the sub-assembly cutter mount by ball detent means acting at a side of said pin.

12. The tool holder of claim 1, in which said cavity is elongated in the direction of its opening to said first-named side of the base for the optional reception of plural tool members in side-by-side relation to one another, the base having means spaced along the length of said cavity to selectively receive wedging clamp rods for securing one or more tool members in the cavity.

13. The tool holder of claim 2, in which said cavity is elongated in the direction of its opening to said forward side of the base for the optional reception of plural tool members in side-by-side relation to one another, the base having means spaced along the length of said cavity to selectively receive wedging clamp rods for securing one or more tool members in the cavity.

14. The tool holder of claim 3, in which said cavity is elongated in the direction of its opening to said first-named side of the base for the optional reception of plural tool members in side-by-side relation to one another, the base having means spaced along the length of said cavity to selectively receive wedging clamp rods for securing one or more tool members in the cavity.

15. The tool holder of claim 4, in which said cavity is elongated in the direction of its opening to said forward side of the base for the optional reception of plural tool members in side-by-side relation to one another, the base having means spaced along the length of said cavity to selectively receive wedging clamp rods for securing one or more tool members in the cavity.

16. The tool holder of claim 6, in which said cavity is elongated in the direction of its opening to said forward side of the base for the optional reception of plural tool members in side-by-side relation to one another, the base having means spaced along the length of said cavity to selectively receive wedging clamp rods for securing one or more tool members in the cavity.

17. The tool holder of claim 2, in which said holder base has means for releasably mounting a tool member sub-assembly thereon forwardly of said cavity thereof.

18. The tool holder of claim 4, in which said holder base has means for releasably mounting a tool member sub-assembly thereon forwardly of said cavity thereof.

19. A tool holder optionally employed to removably mount plural types of machine tool members each characterized by a sub-assembly of at least one cutter and a mount removably receiving the same, said holder comprising a relatively massive base having means to releasably mount the same on a machine tool for machining engagement with workpieces, said holder being provided with a cavity opening through a forward side thereof and proportioned to receive at least one of said machine tool members, at least one locator pin slidably mounted by said holder base to project from above into said cavity into releasable locating engagement with a cutter mount of a tool member sub-assembly so received in said cavity, and a wedging clamp rod also mounted by said base to project from above into said cavity adjacent and to one side of a tool member mount, said rod being rotatable about its upright axis in said base and being provided with a wedging portion frictionally engageable with a side of said tool member mount in clamping the latter to said base, said holder base having means for releasably mounting a tool member sub-assembly thereon forwardly of said cavity thereof, said means comprising a portion of said cutter mount which projects into the cavity for clamping engagement by a wedging clamp rod.

20. The tool holder of claim 4, in which said holder base has means for releasably mounting a tool member sub-assembly thereon forwardly of said cavity thereof, said means comprising a portion of said cutter mount which projects into the cavity for clamping engagement by a wedging clamp rod.

21. The tool holder of claim 17, in which said mounting means comprises a formation on said base from which said last-named tool member assembly is suspended at a formation thereon.

22. The tool holder of claim 19, in which said mounting means comprises a formation on said base from which said last-named tool member assembly is optionally suspended at one of two vertically spaced formations thereon.

23. The tool holder of claim 17, in which said mounting means comprises a formation on said base from which said last-named tool member assembly is suspended at a formation thereon.

24. The tool holder of claim 19, in which said mounting means comprises a formation on said base from which said last-named tool member assembly is optionally suspended at one of two vertically spaced formations thereon.

25. The tool holder of claim 2, in which said locator pin is adjustable vertically relative to said holder base in and out of a position in which the pin has locating engagement with said cutter mount.

26. The tool holder of claim 2, in which said locator pin is adjustable vertically relative to said holder base in and out of a position in which the pin has locating engagement with said cutter mount, said locator pin and clamp rod being vertically removable bodily from said holder.

* * * * *